Patented Oct. 17, 1950

2,526,427

UNITED STATES PATENT OFFICE 2,526,427

FLAME AND HEAT RESISTANT SEALING COMPOUNDS

Eli Simon, Los Angeles, and Frank W. Thomas, Burbank, Calif., assignors to Lockheed Aircraft Corporation, Burbank, Calif.

No Drawing. Application April 30, 1948, Serial No. 24,433

16 Claims. (Cl. 260—22)

This invention relates to sealing materials and has more particular reference to flame and heat resistant sealing compounds.

This application is a continuation-in-part of our application Serial No. 725,732, filed January 31, 1947, now abandoned.

There are many situations where it is important to provide a sealing material that is substantially unaffected by elevated temperatures. For example, the connections and sections of hot air ducts and the fireproof sleeves of superchargers require a sealing compound that will withstand high temperatures. In other applications the heat resistant compounds must be substantially unaffected by water, oils, liquid fuels, solvents, etc. Examples of such applications are the oil sumps of power plants, gasket seals for various mechanical devices and installations where the sealant is exposed both to the weather and to substantial temperatures. In many of the enumerated applications for heat resistant sealants, as well as other situations where such sealing compounds are employed, it is important that the sealant obtain and maintain a continuous unbroken adhesion to the metal or other material to which it is applied, even though subjected to vibration and wide temperature variations. Such maintained adhesion is usually essential in preserving a fluid-tight seal. In addition to the foregoing attributes of a practical heat resistant sealing compound, it is highly desirable that the compound cure to a non tacky, firm, resilient and adherent material in a reasonably short time at normal temperatures and be of such consistencies that it may be applied by troweling, spraying, brushing or injection, as the conditions of use may require.

It is a general object of this invention to provide a sealing compound that effectively resists elevated temperatures, and that is resistant to water, oil, gasoline, and other fluids, and that dependably preserves its adherence without cracking, cold flowing, peeling or developing discontinuities. The material provided by this invention is capable of withstanding temperatures as high as 350° F. for long periods without deleterious effects and will resist temperatures as high as 450° F. for brief or intermittent periods. The adhesion of the compound is excellent when applied to steel, aluminum, wood, brass, and practically all other solid materials and is retained throughout extreme temperature variations.

Another object of the invention is to provide a heat resistant sealing material that cures in a relatively short period of time at room temperatures. Heretofore, sealing materials of this general class have employed polyesters having low acid numbers, such as below 10, and the sealants did not cure satisfactorily in thick sections even with the application of external heat. We have found that by employing a polyester having an acid number of from 60 to 200 we obtain an effective sealant that cures, without the application of heat, by incorporating an alkaline-earth oxide as a reactor. In a typical application the material will cure in from two to sixteen hours at room temperatures to form a firm tack-free coating which is resistant to pressure. The rate of cure and the initial hardness of the compound may be controlled at will by varying the amount of the reactor employed.

It is another object of the invention to provide a sealing material of the class above referred to that is a dielectric or a non-conductor of electricity, and which retains its flexibility in temperatures as low as −50° F. These characteristics adapt the sealant for applications where electrical equipment is present, and in situations where low temperatures are encountered.

It is another object of the invention to provide a sealing compound of the character referred to that is easy and convenient to apply. The consistency of the material may be controlled or varied to adapt it for application by troweling, hand-filleting, brushing, spraying, or pressure injection, depending upon the intended use.

It is a further object of the invention to provide a heat resistant sealing compound of the class above referred to that has good package stability and is suitable for incorporation in repair and service kits, etc.

The base or principal ingredient of the sealing material is a selected polyester resin; namely essentially a product of polyhydric alcohols and dibasic acids, which may also be modified by monobasic fatty acids having varying degrees of unsaturation. In most instances we prefer that the resins be unsaturated and preferably have an iodine value of from 15 to 100. Furthermore, the polyester resin preferably has an acid value range of from approximately 60 to 200 so as to react with alkaline-earth oxides without the application of heat. The reacting components employed in preparing the polyester resin include one or more polyhydric alcohols. A few typical examples of suitable polyhydric alcohols are glycerol, mannitol, sorbitol, and pentaerythritol. Bi-functional alcohols such as ethylene glycol may be employed as modifying agents for the polyhydric alcohols. Such bi-functional alcohols are not suitable as the sole reactant in preparing the polyester resin when a di-basic acid is used because cross-linking is essential in obtaining high temperature stability of the product. The di-basic acid employed in compounding the polyester resin may be maleic acid, adipic acid, sebacic acid, fumaric acid, itaconic acid, phthalic acid, or suitable combinations of the same.

In accordance with our invention the polyester resin constituting the basic component of the sealant may be either oil modified or unmodified. We describe below several typical examples of polyester resins of the class employed in the sealant.

*Example I*

An example of an unmodified polyester resin suitable for use in a sealing compound may be prepared from adipic acid in the proportion of from one and one-half mols to one mol and glycerol in the proportion of from one mol to one and one-half mols. The reactants are first mixed together and are then agitated while maintained at a temperature of from 325° F. to 450° F. for from one to approximately four hours. The reaction is preferably carried out in an inert atmosphere. This provides a saturated polyester resin having an acid value of from 60 to 200 and an iodine value of substantially zero. As an alternative, we may prepare the resin using a mixture of di-basic acids in combination with the glycerol, such as a mixture of adipic acid, a saturated di-basic acid, and maleic acid, an unsaturated di-basic acid, in approximately equal proportions, the condensation reaction being carried to the stage resulting in a resin having an iodine value of 15 to 100 and an acid value of 60 to 200.

*Example II*

An example of a modified polyester fatty acid or resin suitable for incorporation in the sealant may be prepared from:

| | Mols |
|---|---|
| Adipic acid | 6 to 12 |
| Glycerol | 3 to 6 |
| Castor oil | 1 to 2½ |

In preparing the modified polyester resin the glycerol and castor oil are preferably reacted in an inert atmosphere at a temperature of from 425° F. to 450° F. while being agitated. This is continued until ester-interchange (alcoholysis) is essentially complete or a single phase system is attained. Accelerators, such as metallic soaps, for example cobalt naphthanate, may be used during the reaction. The match is then cooled and the adipic acid is added. Following this the batch is stirred at a temperature of from 325° F. to 450° F. in an inert atmosphere for from one to approximately four hours. This will provide a modified polyester having an iodine value of from 15 to 100 and an acid value of from 60 to 200.

*Example III*

Other modifying oils suitable in preparing a modified polyester for incorporation in the sealant include monobasic unsaturated fatty acids such as ricinoleic acid, linoleic acid and elaeostearic acid and triglycerides from linseed oil, cotton seed oil and tung oil. Such modifying oils may be employed individually or in combination in the formulation of the modified polyester resin. An example of this type of resin may be prepared from:

| | Mols |
|---|---|
| Monoglyceride of ricinoleic acid | 2 to 3½ |
| Adipic acid | 2½ to 4½ |
| Maleic anhydride | ¼ to ¾ |

In compounding this resin the monoglyceride of ricinoleic acid is first prepared by heating the ricinoleic acid with the glycerol in a 1 to 1 mol ratio. The reaction is preferably conducted in an inert atmosphere with accompanying agitation at a temperature of approximately 425° F. until the acid number is below 5. Metallic soaps, such as cobalt naphthanate, may be used as accelerators. Following this operation the adipic acid and the maleic anhydride are added. The temperature of the batch is maintained at from 425° F. to 450° F. in an inert atmosphere for approximately one hour, or until the acid number drops to approximately 100. The resin is then cooled in the inert atmosphere.

*Example IV*

| | Mols |
|---|---|
| Monoglyceride of ricinoleic acid | 1½ to 4 |
| Glycerol | ⅛ to 1 |
| Maleic anhydride | ¼ to ¾ |
| Adipic acid | 2½ to 8 |

In preparing the resin of Example IV the ingredients are processed by the regular alkyd making technique until an acid number of from 70 to 90 and an iodine number of approximately 50 are obtained.

The following is an example of a modified polyester resin compounded from mixed polyhydric alcohols and mixed dibasic acids and suitable for incorporation in the sealant of the invention.

*Example V*

| | Mols |
|---|---|
| Monoglyceride of ricinoleic acid | 1½ to 4 |
| Pentaerythritol | 0 to ¼ |
| Glycerol | ⅛ to ⅓ |
| Phthalic anhydride | 0 to 4 |
| Adipic acid | 2½ to 4 |

The resin of Example V is prepared by processing the ingredients in accordance with the usual alkyd making technique until an acid number of from 70 to 100 and an iodine number of about 50 are obtained.

As noted above, the polyester resin, whether modified or unmodified, has an iodine number of from 0 to 100 and may have an acid value of from 60 to 200, and will react with alkaline-earth oxides without the necessity of applying heat. As will be more fully described in the subsequent typical examples of sealant formulations, the polyester resin, either modified or unmodified, constitutes from 20 to 100% by weight of the total solids content of the sealant.

The sealing material may also include an additive for increasing the flame resistance. This additive is preferably an organo phosphate or phosphite ester such as triphenyl, tricresyl, trichloro ethyl, or chlorinated naphthalenes, chlorinated phenyls and water insoluble organo borates. Such additives are compatible with the polyester resin and impart flame resistance as well as additional heat resistance to the sealing material. The proportion or amount of the flame resisting additive and the specific additive employed will depend at least to some extent upon the intended use or applications for the sealant. We have found that triphenyl phosphate has excellent compatibility with the polyester resin and in typical formulations of the sealant, we employ the additive in the proportion of from approximately 5 to 25 parts by weight to 100 parts by weight of resin. The proportion of the flame resistant additive also depends upon the amounts of the asbestos, carbon black and other inert additives employed.

To increase the thermal stability and high temperature adhesion of the sealant we prefer in some intended applications to incorporate the triglyceride of octadecadienoic acid (dehydrated castor oil) in the sealant compound. This stabilizing and adhesion preserving ingredient may be used in the proportion of approximately ½ to 2½ parts by weight to 100 parts by weight of resin.

The strength of the sealant material, its surface toughness and its resistance to cold flow are preferably increased by the inclusion of selected additives or ingredients. The surface toughness of the sealant as cured is substantially increased by the inclusion in the sealant compound of from 1 to 10 parts by weight of a concentrated resorcinol formaldehyde resin to 100 parts by weight of resin. This is preferably a "B" stage condensation product of resorcinol and formaldehyde soluble in alcohol-water solutions and methyl ethyl ketone. To further strengthen the sealant a fine carbon black or re-enforcing silica dioxide of a particle size similar to that of the carbon black may be included. For example, approximately 0.15% by weight, of the total solids content of the sealant, of an ultra fine carbon black may be incorporated in the sealant. However, this percentage may be increased to 15% depending upon the relative amounts of the other inert ingredients present, such as asbestos. To load or fill the sealing material and to prevent cold flowing of the applied material, particularly when used as a filleting putty or when applied in thick bodies or layers, we employ inert fillers, for instance asbestos powder having a Quebec standard testing machine rating of 0.0–0.0–0.–16.0. The relative proportion of the filler employed depends upon the applications of the sealant. However, in typical formulations we include from 10 to 60 parts by weight of the filler to 100 parts by weight of resin.

Where a modified color is desired, we may include from ½% to 5% by weight, based on the total solids content, of a finely divided pigment. Thus, it has been found that aluminum powder having a fineness greater than 400 mesh gives the sealant increased adhesion and improves the appearance of the cured material.

The consistency or fluidity of the sealant is determined by the relative proportion of a selected thinner. The thinner employed may be methyl ethyl ketone, cyclohexanone, methyl n-amyl ketone, methyl cyclohexyl ketone, or methyl isopropyl ketone, or mixtures of these. The amount or proportion of the thinner employed in the sealant may vary from 0 to 80% by weight of the thinned sealant.

The reactors or agents for continuing the resin polymerization are chosen from the oxides of the metals of group II of the periodic table, which metals are bivalent in all of their compounds. Such oxides include calcium oxide, cadmium oxide and zinc oxide, it being understood that the other alkaline-earth oxides are operative. The zinc oxide is preferred where an intermediate speed of reaction or curing is desired. Where a fast acceleration of reaction is required, it is desirable to employ calcium oxide, and where a relatively slow curing action is desired, the cadmium oxide is used. The oxide or oxides are preferably suspended in a non-reactive vehicle, compatible with the polyester resin, to facilitate their incorporation in the sealant compound. Illustration of such vehicles are the alkyl and aryl phosphate esters, raw tung oil, and the liquid glycollate esters, such as ethyl phthalyl ethyl glycollate. Depending upon the rate of cure desired and the temperature of curing, the alkaline-earth oxide reactor, either singly or in admixture, is incorporated in the sealant in the proportion of from 1 to 35 parts by weight of dry or active reactor to 100 parts by weight of resin.

The following examples are illustrative of the rector formulations:

*Example 1*

| | Grams |
|---|---|
| Zinc oxide | 40 |
| Calcium oxide | 7 |
| Diphenyl cresyl phosphate | 40 |

*Example 2*

| | Percent by weight |
|---|---|
| Zinc oxide | 70 |
| Raw tung oil | 15 |
| Methyl ethyl ketone | 15 |

Where the expression "total solids content of the sealant," or the equivalent, is used, it is to be understood as referring to the solids content of the sealant prior to the incorporation or addition thereto of the reactor described above.

The following are typical illustrative examples of the primary sealant formulations of the sealing material:

*Example A*

| | Percent by weight |
|---|---|
| Tung oil | 0.30 |
| Triphenyl phosphate | 21.20 |
| Triglyceride of octadecadienoic acid (dehydrated castor oil) | 0.6 |
| A polyester resin of Example No. III | 52.50 |
| Carbon black | 0.15 |
| Asbestos powder | 17.4 |
| "B" stage condensation product of resorcinol and formaldehyde | 2.60 |
| Aluminum powder | 1.30 |
| Methyl ethyl ketone | 3.95 |

*Example B*

| | Percent by weight |
|---|---|
| Tung oil | 0.25 |
| Triphenyl phosphate | 21.80 |
| Triglyceride of octadecadienoic acid (dehydrated castor oil) | 0.60 |
| A polyester resin of Example No. IV | 50.00 |
| Carbon black | 0.15 |
| Asbestos powder | 20.45 |
| "B" stage condensation product of resorcinol and formaldehyde | 2.50 |
| Aluminum powder | 1.20 |
| Methyl ethyl ketone | 3.05 |

Example C

| | Percent by weight |
|---|---|
| A polyester resin of Example No. IV | 52.50 |
| Raw tung oil | 0.50 |
| Triglyceride of octadecadienoic acid (dehydrated castor oil) | 0.60 |
| "B" stage condensation product of resorcinol and formaldehyde | 2.60 |
| Aluminum powder | 1.20 |
| Triphenyl phosphate | 21.00 |
| Asbestos powder | 21.60 |

The primary sealant material formulations and the above described alkaline-earth oxide reactor formulations are prepared and packaged separately. In preparing the sealant materials a suitable mixer is employed; for example, a double bladed dough mixer may be used. The polyester resin, tung oil and the triglyceride of octadecadienoic acid, the condensation product of resorcinol and formaldehyde and carbon black are first supplied to the mixer. The ingredients are given a preliminary mix or agitation to disperse the reagents. The asbestos, aluminum powder and powdered triphenyl phosphate are then added. The composite mix is run for approximately three hours while maintaining the temperature below 100° F.

Immediately prior to the application of the sealant, the sealant and the reactor formulations are thoroughly mixed together. As previously described, the sealant may be prepared for application by troweling, brushing, hand-filleting, or spraying, by controlling the proportion of the thinner employed. After application, the sealant-reactor system cures tack-free, pressure-resistant, and with good adhesion at room temperature in from two to sixteen hours, depending upon the amount and type of the alkaline-earth oxide employed. The cured applied material has an adhesion which exceeds its cohesion and is not adversely affected by cyclic heating and cooling. Weatherometer tests equivalent to six months' normal weather, indicate that the sealant is well suited for external applications. Immersion tests employing water, 100 Octane gasoline, and hydrocarbon oils, indicate that not more than 6% by weight of water at room temperature is absorbed by the sealant while the other immersion fluids have no noticeable effect upon the sealant. The cured sealant retains good flexibility at temperatures as low as −50° F. and will withstand vibration at such low temperatures without cracking. By omitting the carbon black and the metallic powder the sealant forms an effective dielectric coating or body. When it is intended to apply the material as a filleting compound the concentration of the asbestos is maintained between 15 and 30% by weight of the total solids content. Where the material is to be applied in relatively thin films, the total solids may be decreased to as low as 10% of the total weight of the thinned sealant and the viscosity may be decreased as required, depending upon the mode of application. A permanently plastic adhesive paste may be formed by omitting the alkaline-earth oxide reactor. The material may also be employed as an adhesive if applied in a diluted or thinned condition and using a lesser quantity of reactor per 100 parts of the polyester resin than would normally be employed with the same weight of resin used as a filleting compound, such as in Example A. The applied cured material has a resistance to temperatures ranging as high as 450° F. and has self-extinguishing characteristics. The heat and flame resisting properties of the material well adapt it for numerous applications where conventional sealing materials can not be employed.

Having described only typical forms of the invention, we do not wish to be limited to the specific details herein set forth, but wish to reserve to ourselves any variations or modifications that may appear to those skilled in the art and/or fall within the scope of the following claims.

We claim:

1. A heat resistant sealing compound comprising a polyester resin which is the reaction product of from 1½ to 4 mols of monoglyceride of ricinoleic acid and from 2½ to 8 mols of adipic acid, said resin having an iodine value of 0 to 100 and an acid value of from 60 to 200, from 5 to 25 parts by weight to each 100 parts by weight of said resin of triphenyl phosphate, and from 1 to 35 parts by weight to each 100 parts by weight of said resin of zinc oxide.

2. A heat resistant sealing compound comprising a polyester resin which is the reaction product of from 1½ to 4 mols of monoglyceride of ricinoleic acid and from 2½ to 8 mols of adipic acid, said resin having an iodine value of 0 to 100 and an acid value of from 60 to 200, from 5 to 25 parts of weight to each 100 parts by weight of said resin of triphenyl phosphate, and from 1 to 35 parts by weight to each 100 parts by weight of said resin of calcium oxide.

3. A heat resistant sealing compound comprising a polyester resin which is the reaction product of from 1½ to 4 mols of monoglyceride of ricinoleic acid and from 2½ to 8 mols of adipic acid, said resin having an iodine value of 0 to 100 and an acid value of from 60 to 200, from 5 to 25 parts by weight to each 100 parts by weight of said resin of triphenyl phosphate, and from 1 to 35 parts by weight to each 100 parts by weight of said resin of cadmium oxide.

4. A heat resistant sealing compound comprising a polyester resin having an acid value of from 60 to 200 and an iodine value of from 0 to 100, said resin being the reaction product of from 1½ to 4 mols of monoglyceride of ricinoleic acid, from ⅛ to 1 mol glycerol, from ¼ to ¾ mol maleic anhydride and from 2½ to 8 mols adipic acid, and from 1 to 35 parts by weight of an oxide of a metal of group II of the periodic table that is bivalent in all of its compounds for each 100 parts of said resin.

5. A heat resistant sealing compound comprising a polyester resin having an acid value of from 60 to 200 and an iodine value of from 0 to 100, said resin being the reaction product of from 1½ to 4 mols of monoglyceride of ricinoleic acid, from ⅛ to 1 mol glycerol, from ¼ to ¾ mol maleic anhydride and from 2½ to 8 mols adipic acid, from 5 to 25 parts by weight of triphenyl phosphate for each 100 parts by weight of said resin, and from 1 to 35 parts by weight for each 100 parts of weight of said resin of a reactor comprising a mixture of zinc oxide and calcium oxide in the proportion of from 2 to 4 mols of zinc oxide and from 3 to 1 mols of calcium oxide.

6. A heat resistant sealing compound comprising a polyester resin having an acid value of from 60 to 200 and an iodine value of from 0 to 100, said resin being the reaction product of from 2 to 3½ mols monoglyceride of ricinoleic acid, from 2½ to 4½ mols adipic acid and from ¼ to ¾ mol maleic anhydride, and from 1 to 35 parts by weight of an oxide of a metal of group II of the periodic table that is bivalent in all of its compounds for each 10 parts of said resin.

7. A heat resistant sealing compound comprising a polyester resin having an acid value of from 60 to 200 and an iodine value of from 0 to 100, said resin being the reaction product of from 6 to 12 mols adipic acid, from 3 to 6 mols glycerol, and from 1 to 2½ mols castor oil, from 5 to 25 parts by weight of triphenyl phosphate for each 100 parts by weight of said resin, and from 1 to 35 parts by weight of an oxide of a metal of group II of the periodic table that is bivalent in all of its compounds for each 100 parts of said resin.

8. A heat resistant sealing compound comprising a polyester resin which is the reaction product of from 1½ to 4 mols of monoglyceride of ricinoleic acid and from 2½ to 8 mols of adipic acid, said resin having an iodine value of 0 to 100 and an acid value of from 60 to 200, from 5 to 25 parts by weight to each 100 parts by weight of said resin of triphenyl phosphate, from ½ to 2 parts by weight of octadecadienoic acid for each 100 parts by weight of said resin, and from 1 to 35 parts by weight to each 100 parts by weight of said resin of an oxide of a metal of group II of the periodic table that is bivalent in all of its compounds.

9. A heat resistant sealing compound comprising a polyester resin having an acid value of from 60 to 200 and an iodine value of from 0 to 100, said resin being the reaction product of from 1½ to 4 mols of monoglyceride of ricinoleic acid, from ⅛ to 1 mol glycerol, from ¼ to ¾ mol maleic anhydride and from 2½ to 8 mols adipic acid, from 5 to 25 parts by weight of triphenyl phosphate for each 100 parts by weight of said resin, from ½ to 2 parts by weight of octadecadienoic acid for each 100 parts by weight of said resin, and from 1 to 35 parts by weight of an oxide of a metal of group II of the periodic table that is bivalent in all of its compounds for each 100 parts of said resin.

10. A heat resistant sealing compound comprising a polyester resin reacted from 1½ to 4 mols of monoglyceride of ricinoleic acid and from 2½ to 8 mols of adipic acid, said resin having an iodine value of 0 to 100 and an acid value of from 60 to 200, from 5 to 25 parts by weight to each 100 parts by weight of said resin of triphenyl phosphate, from 1 to 10 parts by weight of the "B" condensation product of resorcinol and formaldehyde for each 100 parts by weight of said resin, and from 1 to 35 parts by weight to each 100 parts by weight of said resin of an oxide of a metal of group II of the periodic table that is bivalent in all of its compounds.

11. A heat resistant sealing compound comprising a polyester resin having an acid value of from 60 to 200 and an iodine value of from 0 to 100, said resin being the reaction product of from 1½ to 4 mols of monoglyceride of ricinoleic acid, from ⅛ to 1 mol glycerol, from ¼ to ¾ mol maleic anhydride and from 2½ to 8 mols adipic acid, from 5 to 25 parts by weight of triphenyl phosphate for each 100 parts by weight of said resin, from 1 to 10 parts by weight of the "B" condensation product of resorcinol and formaldehyde for each 100 parts by weight of said resin, and from 1 to 35 parts by weight of an oxide of a metal of group II of the periodic table that is bivalent in all of its compounds for each 100 parts of said resin.

12. A heat resistant sealing compound comprising a polyester resin reacted from 1½ to 4 mols of monoglyceride of ricinoleic acid and from 2½ to 8 mols of adipic acid, said resin having an iodine value of 0 to 100 and an acid value of from 60 to 200, from 5 to 25 parts by weight to each 100 parts by weight of said resin of triphenyl phosphate, from 10 to 60 parts by weight of powdered asbestos for each 100 parts by weight of said resin, and from 1 to 35 parts by weight to each 100 parts by weight of said resin of an oxide of a metal of group II of the periodic table that is bivalent in all of its compounds.

13. A heat resistant sealing compound comprising a polyester resin having an acid value of from 60 to 200 and an iodine value of from 0 to 100, said resin being the reaction product of from 1½ to 4 mols of monoglyceride of ricinoleic acid, from ⅛ to 1 mol glycerol, from ¼ to ¾ mol maleic anhydride and from 2½ to 8 mols adipic acid, from 5 to 25 parts by weight of triphenyl phosphate for each 100 parts by weight of said resin, from 10 to 60 parts by weight of powdered asbestos for each 100 parts by weight of said resin, and from 1 to 35 parts by weight of an oxide of a metal of group II of the periodic table that is bivalent in all of its compounds for each 100 parts of said resin.

14. A heat resistant sealing compound comprising a polyester resin having an acid value of from 60 to 200 and an iodine value of from 0 to 100, said resin being the reaction product of from 1½ to 4 mols of monoglyceride of ricinoleic acid, from ⅛ to 1 mol glycerol, from ¼ to ¾ mol maleic anhydride and from 2½ to 8 mols adipic acid, from 5 to 25 parts by weight of triphenyl phosphate for each 100 parts by weight of said resin, from 10 to 60 parts by weight of powdered asbestos for each 100 parts by weight of said resin, and from 1 to 35 parts by weight of a reactor for said resin for each 100 parts of said resin, the reactor comprising a mixture of zinc oxide and calcium oxide in the proportion of from 2 to 4 mols of zinc oxide to from 3 to 1 mols of calcium oxide.

15. A heat resistant sealant consisting essentially of the following resin mixture-reactor system on an approximate weight basis:

*Resin mixture*

| | Grams |
|---|---|
| A polyester resin with an acid number of from 70 to 90 formed by the reaction of from 1½ to 4 mols monoglyceride of ricinoleic acid, from ⅛ to 1 mol glycerol, from ¼ to ¾ mol maleic anhydride and from 2½ to 8 mols adipic acid | 52.50 |
| Raw tung oil | 0.50 |
| Triglyceride of octadecadienoic acid | 0.60 |
| "B" stage condensation product of resorcinol and formaldehyde | 2.60 |
| Aluminum powder | 1.20 |
| Carbon black | 0.15 |
| Triphenyl phosphate | 21.00 |
| Asbestos powder | 21.60 |

*Reactor*

| | Grams |
|---|---|
| Zinc oxide | 10.5 |
| Raw tung oil | 2.3 |
| Methyl ethyl ketone | 2.2 |

16. A heat resistant sealing material consisting essentially of the following resin mixture-reactor system on an approximate weight basis:

*Resin mixture*

| | Grams |
|---|---|
| A polyester resin with an acid number of from 70 to 90 formed by the reaction of from 1½ to 4 mols monoglyceride of ricinoleic acid, from ⅛ to 1 mol glycerol, from ¼ to ¾ mol maleic anhydride and from 2½ to 8 mols adipic acid | 52.5 |
| "B" stage condensation product of resorcinol and formaldehyde | 2.6 |
| Triphenyl phosphate | 21.0 |
| Asbestos powder | 23.9 |

*Reactor*

| | Grams |
|---|---|
| Zinc oxide | 11.0 |
| Calcium oxide | 2.0 |
| Di-phenyl cresyl phosphate | 11.0 |

ELI SIMON.
FRANK W. THOMAS.

REFERENCES CITED

The following references are of record in the file of this patent:

UNITED STATES PATENTS

| Number | Name | Date |
|---|---|---|
| 1,889,130 | Patterson | Nov. 29, 1932 |
| 1,975,246 | Zwilgmeyer | Oct. 2, 1934 |
| 1,977,652 | Stratford et al. | Oct. 23, 1934 |
| 2,056,656 | Ellis | Oct. 6, 1936 |